Figure 1:
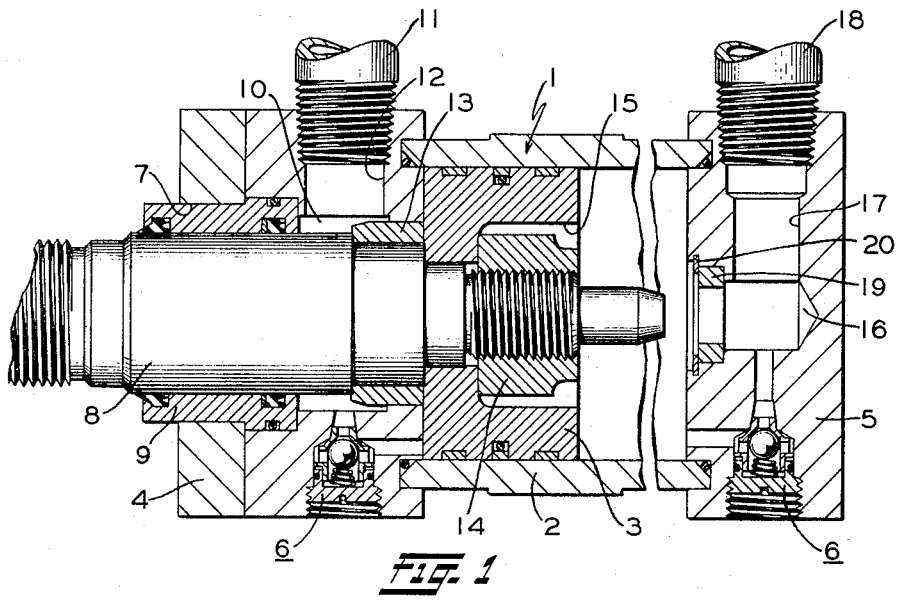

Feb. 14, 1967  R. F. SCHMOEGER  3,303,746
CUSHIONED CYLINDER ARRANGEMENT HAVING A COMBINED
CHECK VALVE AND NEEDLE VALVE
Filed Dec. 29, 1965

INVENTOR.
RALPH F. SCHMOEGER
BY
Attorney

United States Patent Office 3,303,746
Patented Feb. 14, 1967

3,303,746
CUSHIONED CYLINDER ARRANGEMENT HAVING A COMBINED CHECK VALVE AND NEEDLE VALVE
Ralph F. Schmoeger, Lexington, Ky., assignor to Westinghouse Air Brake Company, Wilmerding, Pa., a corporation of Pennsylvania
Filed Dec. 29, 1965, Ser. No. 517,290
4 Claims. (Cl. 91—26)

This invention relates generally to fluid pressure operated cylinders having an arrangement for cushioning the piston at one or opposite ends of its stroke, including a check valve and choke and more particularly to a piston cushioning arrangement wherein the check valve and choke are embodied in a single unit.

Heretofore, in cushioned cylinders of the type having a plunger or boss carried on the piston or piston stem which enters into a closely conforming bore in the cylinder head near the end of the piston stroke in that direction, it has been customary to provide in the cylinder head at each end separate passages in one of which a check valve is provided past which fluid under pressure is resupplied to the piston chamber for reverse travel thereof, and in the other of which a needle or choke valve is provided for restricting escape of fluid trapped in the piston chamber near the end of the piston stroke as the plunger or boss enters the bore in the cylinder head.

It is the object of the present invention to provide in a single tapped bore in a cylinder head a combined check valve and choke valve to considerably reduce the number of parts and the drilling required to locate these parts in the cylinder head.

In the present invention, this object is achieved by providing in a single bore extending through the wall of a cylinder head to communicate the exterior of the head with the central supply-exhaust cavity, which bore is threaded at its exterior opening and tapered inwardly at its interior opening, a unitary check valve and choke valve providing uni-directional fluid flow checking action and bidirectional choking action of the same fluid in by-pass of said checking action. The combined check valve and choke valve comprises a pair of hollow cylindrical members telescopically fitted together to form a choke valve member having a chamber therein, one member being threaded for axial adjustment in the correspondingly threaded bore, and the other member being tapered at its upper end for fitting in sealing engagement with a tapered inner end of the bore communicating with a combined supply and exhaust cavity in the cylinder head, whereby axial movement of the threaded member seats or unseats the tapered end of the other member relative to the tapered portion of the bore to provide a choke valve action therebetween. A ball check valve member is disposed in the valve chamber formed between the members and is biased into engagement with the upper inside wall of the chamber to close a passage extending axially through the tapered valve end in axial communication with the tapered portion of the bore in the cylinder head. A passage means extending laterally through the other member communicates the check valve chamber with the bore in the cylinder head, which bore communicates by way of second passage means with the cylinder to transmit fluid pressure to the face of the piston upon opening of the check valve.

Figure 2:
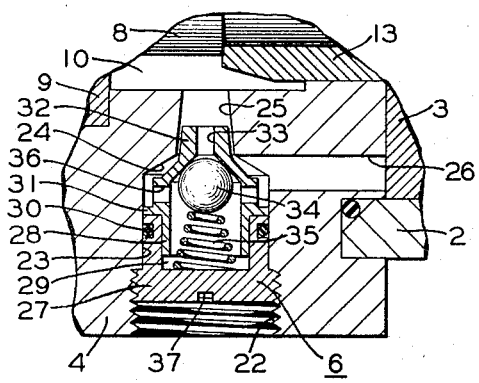

The above and other objects will become more readily apparent when taken in conjunction with the following detailed description and the accompanying drawings forming a part hereof, and in which:

FIG. 1 is a sectional view of a cushioned cylinder showing the present invention; and
FIG. 2 is an enlarged sectional view of the combined check valve and choke valve shown in FIG. 1.

Referring now to FIG. 1 of the drawings, there is shown a cushioned cylinder generally indicated at 1 and including a cylinder member 2, a piston assembly 3 reciprocably disposed in the cylinder, a pair of cylinder heads 4 and 5 disposed at opposite ends of the cylinder and attached thereto by any suitable means, and a combined check valve and choke valve member 6 disposed in each cylinder head 4, 5.

The cylinder head 4 includes an axial bore 7 of varying diameter along its length to receive therethrough a piston rod 8 spaced from the bore by means of an outer bushing member and sealing ring assembly 9 suitably fixed in the head 4, and to form a chamber 10 between the bore and the piston rod, which chamber is communicated with a supply-exhaust pipe 11 by way of a supply-exhaust passage 12. An annular cushion ring 13 is slidably disposed with clearance on a necked portion of the piston rod for a close sliding fit in the bore 7 immediately adjacent the cylinder 2 to effect a cushioning action when the cushion ring slides into bore 7 at the extreme leftward movement of the piston rod, the cushion element 13 being radially movable to provide self-centering action.

The piston 3 is sleeved on the piston rod 8 adjacent the cushion ring 13 on another necked portion of the rod and is held in position thereon by way of a nut 14 threaded on the piston rod so as to be enclosed in a cavity 15 in the end of the piston facing away from the cushion ring 13.

The cylinder head 5 includes an axially disposed cylindrical cavity 16 adapted to receive therein with slight clearance the tapered distal end of the piston rod 8, and also includes a supply-exhaust passage 17 communicating internally with the cavity 16 and communicating externally with a pipe 18 adapted for connection to a source of supply, or exhaust, not shown. A suitable bushing 19 is secured, as by a snap ring, in a recess 20 of the cavity to provide a seal for effecting a cushion action when the end of the piston rod 8 slides therethrough.

The present invention resides in combining with the substantially conventional cylinder, as described above, a combined check valve and choke valve unit, generally indicated at 6, in a single bore in at least one of the cylinder heads 4 and 5, such a unit 6 being shown in each head 4, 5 for bidirectional adjustable cushioning action of the piston 3 when desired, it being understood that only one such unit 6 may be included where desired.

Referring now to both FIGS. 1 and 2 of the drawing, and to FIG. 2 in particular, it will be observed that the combined check valve and choke valve 6 is disposed as a single unit in a single bore having a threaded outer end 22, an intermediate counterbore 23 tapered inwardly at its upper end 24 and an upper counterbore 25 tapered throughout its length to form a valve seat and communicating at its upper end with chamber 10 in the cylinder head 4. A laterally disposed passage 26 communicates the intermediate bore portion 23 with the cylinder 2 and the left face of piston 3 at the right end of the head 4.

The combined check valve and choke valve 6 is disposed in the bore 22, and counterbores 23 and 25 for selective axial movement therein and comprises a pair of hollow cylindrical members 27 and 28 telescopically fitted together to comprise a choke valve member having a choke valve chamber 29 therein. The lower member 27 is externally threaded for axial movement in bore 22 and includes a reduced upper portion slidably received in counterbore 23 and sealed with respect thereto by means of an O-ring 30 peripherally carried thereby. The upper member 28 is received in the member 27 to a depth determined by a flange 31 thereon overlying the upper end of the lower member 27 and has an external diameter smaller than that of counterbore 23 to form a cavity between the member 28 and the counterbore 23 for passage of fluid, as explained below. The extreme upper end 32 of member 28 is externally tapered to a degree corresponding to the taper of counterbore 25 thus comprising a choke valve which seats with respect to the valve seat taper of counterbore 25 when the member 27 is threaded fully into bore 22. A bore 33 is provided axially of member 28 to communicate the valve chamber 29 by way of counterbore 25 with the chamber 10 formed between the piston rod 8 and bore 7, the bore 33 being smaller than the diameter of chamber 29 to form a valve seat at the junction of bore 33 and chamber 29. A ball valve 34 having a diameter greater than that of bore 33 and less than that of chamber 29 is disposed in the valve chamber 29 and biased into sealing engagement with the bore 33 by a spring 35 disposed between the ball 34 and the member 27. A passage or passages 36 are provided laterally through member 28 to communicate the valve chamber 29 with the counterbore 23 for passage of fluid from chamber 10, through bore 33, past ball valve 34 to passage 26 to the piston face when chamber 10 is connected to supply.

The combined check valve and choke valve 6 in cylinder head 5 is identical to that described above and is disposed in a single bore in head 5, also in the manner described above.

In the operation of the device, it will be observed that the check valve and choke valve unit 6 may be threadedly adjusted in bore 22 by means of a slot 37, disposed in the end of member 27, which slot may receive a suitable adjusting tool, so as to seat or unseat valve 32 relative to valve seat 25. In the latter position, when valve 32 is open a desired amount, movement of the piston 3 to the left causes cushion member 13 to enter cavity 10 at the end of the stroke, thus cutting off exhaust of fluid from the cylinder chamber through bore 7. However, fluid may still pass from the cylinder chamber through passage 26, around member 28, through the unseated valve 32 and counterbore 25 to chamber 10 and out supply-exhaust passage 12 then serving as exhaust, thus providing a cushioning action of piston 13 to a degree desired in accordance with the setting of choke valve member 32. When exhaust passage 12 is serving as a supply passage to effect a return stroke of piston 3, pressurized fluid enters chamber 10, counterbore 25, bore 33 to depress and open ball valve 34, through passages 36 and 26 to the face of piston 13 to initiate piston movement to the right.

Having now described the invention, what I claim as new and desire to secure by Letters Patent is:

1. In a fluid pressure operated cylinder assembly comprising a cylinder, a head element attached to one end of said cylinder, a piston reciprocably disposed in said cylinder, a combination cylindrical air inlet and air exhaust cavity defined in said head element substantially concentric with said cylinder and opening centrally thereinto via which air in said cylinder displaced by said piston during its initial movement towards said element is exhausted and via which air under pressure may be admitted to the cylinder for movement of said piston away from said element, a cylindrical element substantially concentrically disposed to one side of said piston and movable therewith for telescopic insertion into said cavity with slight clearance serving to restrict the egress of fluid from said cylinder as the piston approaches the head, a bore in said head having one end opening exteriorly of said head and the other end opening in said cavity, and a first passage means in said head communicating said bore intermediate its ends with the face of said head and disposed interiorly of said cylinder, an adjustable cushion mechanism, comprising:
   (a) a choke valve member disposed in said bore to close off communication between its ends and axially movable in said bore to open and close communication between said other end of the bore and said passage, the degree of communication therebetween depending upon the axial position of said choke valve member in said bore means,
   (b) second passage means in said choke member communicating said other end of said bore with said first passage means, and
   (c) a check valve member disposed in said choke valve member and biased to close said second passage in opposition to a predominant fluid pressure in said other end of the bore relative to pressure in said first passage.

2. The fluid pressure operated piston and cylinder assembly as recited in claim 5, further characterized in that:
   (a) said choke valve member comprises a pair of hollow cylindrical members each having one open end and fitted together with the open end of one member telescopically disposed in the open end of the other member.

3. The fluid pressure operated piston and cylinder assembly as recited in claim 2, further characterized in that
   (a) said bore includes a narrower portion at said other end thereof tapered inwardly toward said cavity and forming a valve seat,
   (b) said one member includes an axial extension thereon tapered to form a valve member for seating on said narrower tapered bore portion, and
   (c) said second passage means includes a passage opening at one end centrally of said axial extension of said one member and opening at the other end laterally of said one member, 4. The fluid pressure operated piston and cylinder assembly as recited in claim 3, further characterized in that,
   (a) said one member and said second member of said check valve member when fitted together form a valve chamber therebetween, which valve chamber forms a midportion of said second passage means, said mid-portion having a larger diameter than the remainder of said second passage means,
   (b) said check valve member comprises a ball having a diameter smaller than that of said valve cavity and larger than that of said remainder of said second passage means, and
   (c) a spring means is disposed between said ball and said other one of said pair of choke valve members to bias said ball into engagement with a portion of said valve chamber to seal off said one end of said second passage means.

References Cited by the Examiner
UNITED STATES PATENTS

| | | | |
|---|---|---|---|
| 2,566,774 | 10/1951 | Otis | 251—117 |
| 2,922,432 | 1/1960 | Huntington | 251—117 |
| 3,122,063 | 2/1964 | Chorkey | 91—394 X |
| 3,196,753 | 7/1965 | Maurer | 91—26 |

MARTIN P. SCHWADRON, *Primary Examiner.*

P. T. COBRIN, P. E. MASLOUSKY,
*Assistant Examiners.*

UNITED STATES PATENT OFFICE
CERTIFICATE OF CORRECTION

Patent No. 3,303,746                                 February 14, 1967

Ralph F. Schmoeger

It is hereby certified that error appears in the above numbered patent requiring correction and that the said Letters Patent should read as corrected below.

Column 4, line 21, for the claim reference numeral "5" read -- 1 --.

Signed and sealed this 17th day of October 1967.

(SEAL)
Attest:

Edward M. Fletcher, Jr.                              EDWARD J. BRENNER
Attesting Officer                                       Commissioner of Patents

Disclaimer 3,303,746.—*Ralph F. Schmoeger*, Lexington, Ky. CUSHIONED CYLINDER ARRANGEMENT HAVING A COMBINED CHECK VALVE AND NEEDLE VALVE. Patent dated Feb. 14, 1967. Disclaimer filed June 27, 1969, by the assignee, *Westinghouse Air Brake Company*.

Hereby enters this disclaimer to claim 1 of said patent.

[*Official Gazette October 14, 1969.*]